United States Patent
Andersson et al.

(10) Patent No.: US 10,004,238 B2
(45) Date of Patent: Jun. 26, 2018

(54) KNEADING DEVICE FOR POST-WORKING OF A PRODUCT

(71) Applicant: Sanso Förvaltning AB, Hörby (SE)

(72) Inventors: Mats Rickard Andersson, Hörby (SE); Peter-Nemo Lorens Fredrik Ivarson, Enskede (SE)

(73) Assignee: SANSO FORVALTNING AB, Horby (SE)

( * ) Notice: Subject to any disclaimer, the term of this patent is extended or adjusted under 35 U.S.C. 154(b) by 85 days.

(21) Appl. No.: 15/034,750

(22) PCT Filed: Nov. 7, 2014

(86) PCT No.: PCT/SE2014/051325
§ 371 (c)(1),
(2) Date: May 5, 2016

(87) PCT Pub. No.: WO2015/069181
PCT Pub. Date: May 14, 2015

(65) Prior Publication Data
US 2016/0270412 A1   Sep. 22, 2016

(30) Foreign Application Priority Data
Nov. 8, 2013   (SE) ..................... 1351326

(51) Int. Cl.
*A21C 1/02* (2006.01)
*A21C 1/04* (2006.01)
(Continued)

(52) U.S. Cl.
CPC ............... *A21C 1/149* (2013.01); *A21C 1/02* (2013.01); *A21C 1/04* (2013.01); *A21C 1/1405* (2013.01);
(Continued)

(58) Field of Classification Search
CPC .. A21C 1/02; A21C 1/04; A21C 1/149; A21C 1/1405; B01F 7/00208;
(Continued)

(56) References Cited

U.S. PATENT DOCUMENTS

| | | | | |
|---|---|---|---|---|
| 2,278,051 A | * | 3/1942 | Ambrose | .................. D01F 2/08 241/257.1 |
| 3,054,565 A | * | 9/1962 | Willems | ................... A21C 1/02 241/162 |

(Continued)

FOREIGN PATENT DOCUMENTS

| | | |
|---|---|---|
| DE | 1298401 B | 6/1969 |
| EP | 0351125 A1 | 1/1990 |

(Continued)

OTHER PUBLICATIONS

International Search Report for PCT/SE2014/051325 dated Jan. 30, 2015.
(Continued)

*Primary Examiner* — Charles Cooley
(74) *Attorney, Agent, or Firm* — Moser Taboada

(57) ABSTRACT

A kneading device 1 comprising an inner cone 2 and an outer cone 3, wherein the inner cone 2 and the outer cone 3 defines a space 4 in between the inner cone and the outer cone; from a horizontal plane the inner cone 2 inclines and forms an angle ic; from the same horizontal plane the outer cone 3 inclines and forms an angle oc; where the inner cone 2 has an opening in a bottom of the inner cone 2; where both the inner cone 2 and the outer cone 3 continue vertically in an inner extension 5 and an outer extension 6, respectively, wherein a space in between the inner extension 5 and the outer extension 6 is a gap E; where scraping wings 7 extend from a center portion 8 of the kneading device 1 and through the inner cone 2 and the outer cone 3 and towards, but not fixated to, an inner wall 9 of the outer cone 3; and where the (Continued)

outer cone 3 inclines more than the inner cone 2, when viewed from the horizontal plane, so that angle oc>angle ic.

14 Claims, 4 Drawing Sheets

(51) Int. Cl.
  *A21C 1/14* (2006.01)
  *B01F 7/20* (2006.01)
  *B01F 7/16* (2006.01)
  *B01F 7/00* (2006.01)
  *B01F 15/00* (2006.01)

(52) U.S. Cl.
  CPC ...... *B01F 7/00208* (2013.01); *B01F 7/00275* (2013.01); *B01F 7/162* (2013.01); *B01F 7/20* (2013.01); *B01F 15/00876* (2013.01); *B01F 2215/0422* (2013.01); *B01F 2215/0431* (2013.01)

(58) Field of Classification Search
  CPC ...... B01F 7/008; B01F 7/00825; B01F 7/186; B01F 7/20; B01F 15/00876; B01F 7/00783; B01F 7/162
  See application file for complete search history.

(56) References Cited

U.S. PATENT DOCUMENTS

| | | | |
|---|---|---|---|
| 3,638,917 A | | 2/1972 | Osten |
| 5,505,537 A | * | 4/1996 | Previero ............... B01F 7/245 34/182 |
| 5,762,273 A | * | 6/1998 | Shubin ................ B02C 13/08 241/152.2 |
| 5,823,673 A | * | 10/1998 | Muntener ............ A23G 1/10 366/149 |
| 9,668,486 B2 | * | 6/2017 | Chiaramello ........ A21C 1/1435 |
| 9,854,813 B2 | * | 1/2018 | Chiaramello ........ A21C 1/1405 |
| 2015/0216183 A1 | * | 8/2015 | Chiaramello ........... A21C 1/02 426/504 |
| 2016/0270412 A1 | * | 9/2016 | Andersson ............ A21C 1/02 |

FOREIGN PATENT DOCUMENTS

| | | | |
|---|---|---|---|
| FR | 2052018 | * | 4/1971 |
| GB | 1037665 A | | 8/1966 |
| JP | S52120194 U | | 9/1977 |
| JP | 2007259819 A | | 10/2007 |
| SU | 991968 A1 | | 1/1983 |
| TW | I278283 B | | 4/2007 |

OTHER PUBLICATIONS

Supplementary European Search Report dated Jun. 6, 2017 for Application No. 14860413.

* cited by examiner

KNEADING DEVICE FOR POST-WORKING OF A PRODUCT

FIELD OF THE INVENTION

The present invention relates to a kneading device.

TECHNICAL BACKGROUND

There are mixing devices for mixing dough products on the market today. Many of these relate to the mixing of water and flour, and of course yeast and other possible ingredients. Furthermore, many such devices and systems comprising such are related to batch operations.

One aim of the present invention is to provide a device intended for post-working of a dough product and which device is optimal for kneading such a product.

SUMMARY OF THE INVENTION

The stated purpose above is achieved by a kneading device comprising an inner cone and an outer cone, wherein:
- the inner cone and the outer cone defines a space in between the inner cone and the outer cone;
- from a horizontal plane the inner cone inclines and forms an angle ic;
- from the same horizontal plane the outer cone inclines and forms an angle oc;
- the inner cone has an opening in a bottom of the inner cone;
- both the inner cone and the outer cone continue vertically in an inner extension and an outer extension, respectively, wherein a space in between the inner extension and the outer extension is a gap (E);
- scraping wings extend from a centre portion of the kneading device and through the inner cone and the outer cone and towards, but not fixated to, an inner wall of the outer cone;

and wherein
the outer cone inclines more than the inner cone, when viewed from the horizontal plane, so that angle oc>angle ic.

With reference to inter alia FIG. 1, a material intended to be kneaded is put into the inner cone from above. As the inner cone is open in the bottom, the material falls down towards the bottom of the device. The bottom hole should be large enough to ensure no evident risk of clogging. The rotating scraping wings kneads the material in a first kneading zone and drives the material upwards through the space in between the inner cone and outer cone, via an upper situated massaging zone and finally out from the device after having passed the extension zone between the inner and outer cone.

The difference in the angles oc being larger than the angle ic has several important impacts on the device and result of a material being kneaded in the device. The difference in the angles is important for the actual working of the material, in terms of the actual mechanical and chemical affect of the material being worked and also for driving the material upwards through a kneading zone and into a massaging (rolling) zone and further out from the device as finished products. So, the kneading device according to the present invention has several advantages in comparison to existing devices. One first advantage is directed to the actual working up of the product in the device. The device kneads the material in a first kneading zone and then massages the material in a massaging zone of the device, and hence does not mix the material as common in many mixer devices. Secondly, the device is optimal for the post-working of a wheat dough product, in terms of the working of the dough, the production of suitably shaped products and also how the gluten chemistry in the dough is affected. This is further explained below.

BRIEF DESCRIPTION OF THE DRAWINGS

In the drawings, some specific embodiments of the present invention are disclosed.

Also

SPECIFIC EMBODIMENTS OF THE INVENTION

Figure 1:
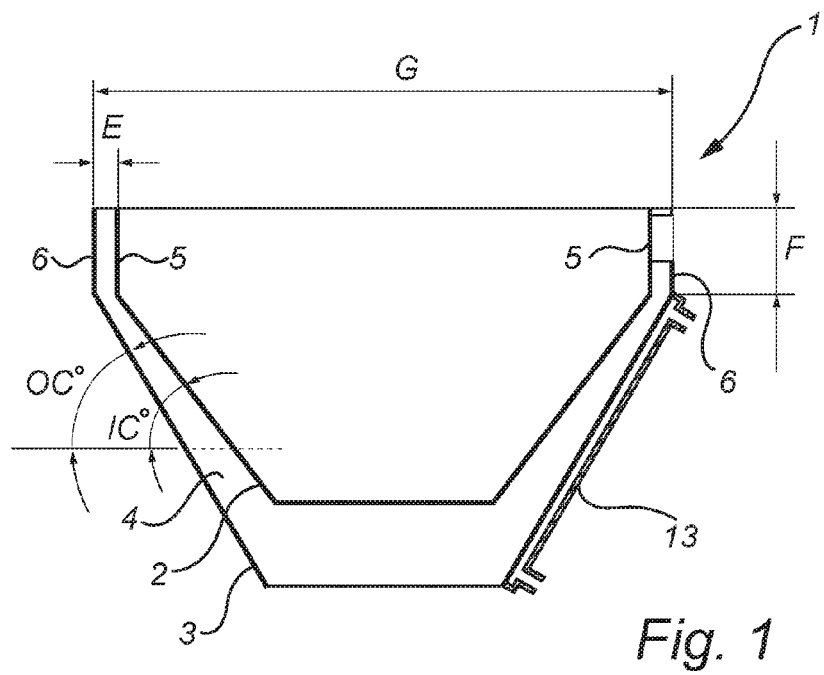
FIG. 1 shows a cross-sectional view of a kneading device according to one specific embodiment of the present invention. Both the outer and inner cone are shown clearly, and it may further be seen that the outer cone inclines more than the inner cone, when viewed from the horizontal plane, so that angle oc>angle ic. In this case the scraping wings are not shown.

Below, specific embodiment of the present invention are presented.

According to one embodiment, the angle oc is in the range of 45-75 degrees. This range of the angle for the outer cone is suitable for achieving both a high kneading effect in the lower situated kneading zone of the device and a high massaging effect in the upper part of the device.

According to yet another specific embodiment, the angle oc is at least 15 degrees larger than the angle ic. As may be seen in FIG. 1 this difference in angles affects the shape of the space in between the inner cone and the outer cone. The shape of the space is important for the possibility of driving the material upwards through this space, via both the kneading zone and massaging zone, and then out from the device as finished products.

According to one other embodiment, a radius line from the centre of the kneading device which crosses a start of one of said scraping wings in a point from which point said scraping wing extends towards an inner wall of the outer cone, and wherein the radius line and the extension of the scraping wing forms an angle uv, and wherein the angle uv has a relationship to the angle oc which is 1<(angle uv/angle oc)<2. The angle uv may be seen when viewing FIG. 2. The relationship between these angles of the scraping wings and the angle of the outer cone (oc) is of relevance for obtaining a scraping effect where the material is worked in a kneading and finally massaging mode and is also driven upward through the space between the inner and outer cone. In this context it may further be said that the kneading is obtained in the "cone zone" of the device and the massaging is obtained in the "extension zone" of the device according to the present invention.

According to one specific embodiment, all of the scraping wings are angled so that all scraping wing angles are 1<(angle uv/angle oc)<2. According to yet another embodiment, all of the uv angles are the same or at least substantially the same for all scraping wings. It may be said that when viewing FIG. 2 and looking into the uv angle it is of importance to realize that all angles uv are angles in a horizontal plane. In relation to the scraping wings, not only the angle uv is of importance. As may be seen in the figures (FIGS. 4 and 5), the scraping wings have a bent configuration following the shape of the outer cone. This so that the scraping effect may be obtained towards the inner wall of the outer cone. According to yet another specific embodiment, (angle uv/angle oc) is <1.2, such as e.g. even <1.1. Having (angle uv/angle oc) being near 1, but still above 1, may provide preferable kneading properties. In this case the scraping wings are working the material in a fashion so that it is driven upwards, but not much. It may also be mentioned that the preferable kneading effect provided by the device according to the present invention is also provided in the gap E of the device. The kneading and rolling effect obtained in the gap E is also a key feature of the present invention.

Figure 4:
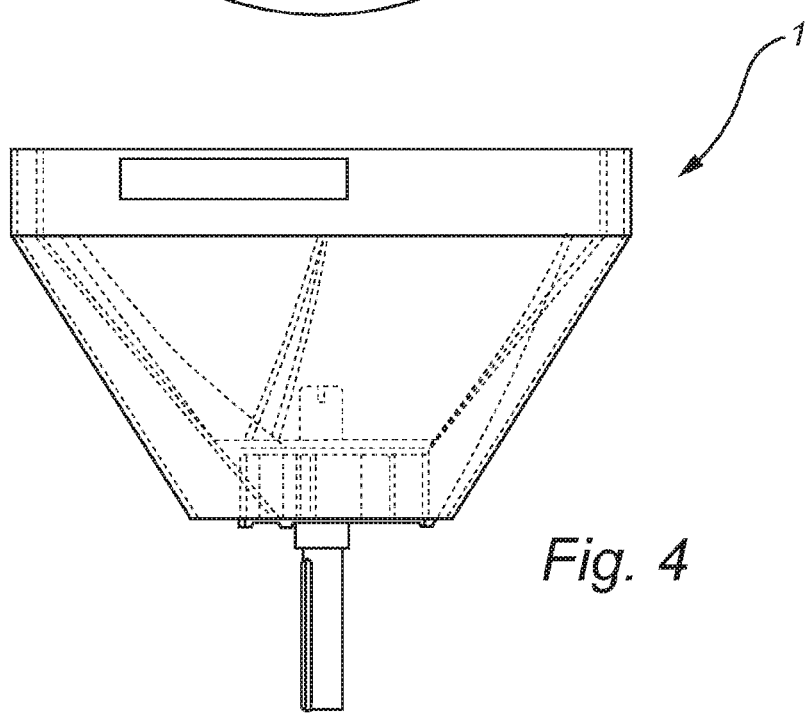
FIG. 4 also shows a kneading device according to one embodiment, viewed from the side and as a sectional figure.

In relation to the scraping wings it should further be mentioned that these may be shorter in vertical length according to the present invention than e.g. presented in FIG. 4.

The kneading device according to the present invention provides both kneading and massaging of the dough product. As mentioned above, kneading is obtained in the cone zone and the massaging is obtained in the extension zone. In the case of e.g. wheat dough the final products may be shaped like sausages. This is not only of interest in terms of the product shape as such, but also for affecting the gluten chemistry in the dough. The shaping to sausage-like products is performed in the extension zone. In the kneading zone the shorter and weaker gluten bonds are broken. Furthermore, stronger gluten bonds are formed. Then, in the massaging zone, that is in the space between the extensions (see distance F in FIG. 1), the kneading device according to the present invention promotes the formation of the longer and thereby elastic gluten bonds (sausage-like products are formed). Fact is that if sausages are formed this may be seen as a proof of that the device have provided a good development of strong and elastic gluten bonds. If no sausages are formed, then the gluten development has not been effective. As may be understood, the kneading device may be seen as a gluten enhancer or device promoting the formation of stronger and also longer and elastic gluten bonds.

Figure 2:
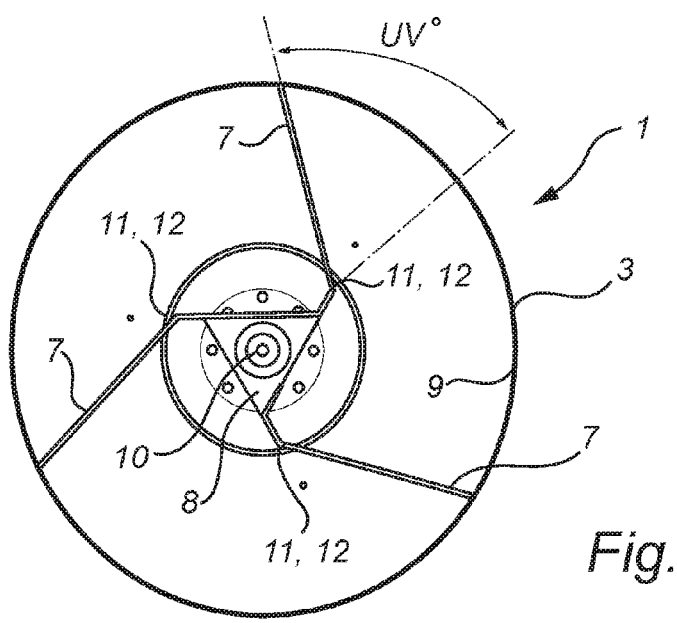
FIG. 2 shows a kneading device according to one embodiment of the invention, seen from above. In this case, both the centre portion and the scraping wings are clearly seen.

As may be understood from above, the kneading device may have several scraping wings. According to one embodiment, the kneading device comprises from 2 to 16 wings, such as from 2 to 8 wings. According to one specific embodiment, the kneading device comprises from 2 to 4 scraping wings, such as e.g. 3 scraping wings as shown in FIG. 2.

In relation to the gap E, this gap is extending either upwards or downwards. According to different specific embodiments according to the present invention, the gap E is extending upwards and vertically (see FIG. 1), upwards and outwards from a vertical plane (see FIGS. 6 and 9), or upwards and inwards from a vertical plane (see FIG. 10). Even if upwards normally is preferable, and two suitable alternatives are either vertically or outwards from a vertical plane, also a gap E extending downwards and outwards from a vertical plane is possible according to the present invention (see FIG. 7).

Once again, and to summarize, one suitable alternative is a gap E extending outwards from the centre of the device with an angle from a vertical plane. According to yet another embodiment of the present invention the gap E is extending upwards and vertically or at least substantially vertically.

Moreover, the gap E may be provided in between an inner extension 5 and an outer extension 6 which are parallel (see FIG. 1). Furthermore, there may also be provided a narrowing so that the size of the gap E is decreasing along its extension. Parallel inner extension 5 and outer extension 6 is one alternative which is of interest for several applications. Also a widening gap E where the size of the gap E is increasing along its extension (see FIGS. 6, 7 and 8) is an alternative according to the present invention which is very interesting and finds use in many applications. The best alternative of a narrowing gap E, a gap E which has the same size along its extension or a gap E in the shape of a funnel (with increasing size of the gap E along its extension), or any other alternative which may be a mix of these versions along the inner extension 5 and outer extension 6, depends on the intended use of a device according to the present invention.

Figure 6:
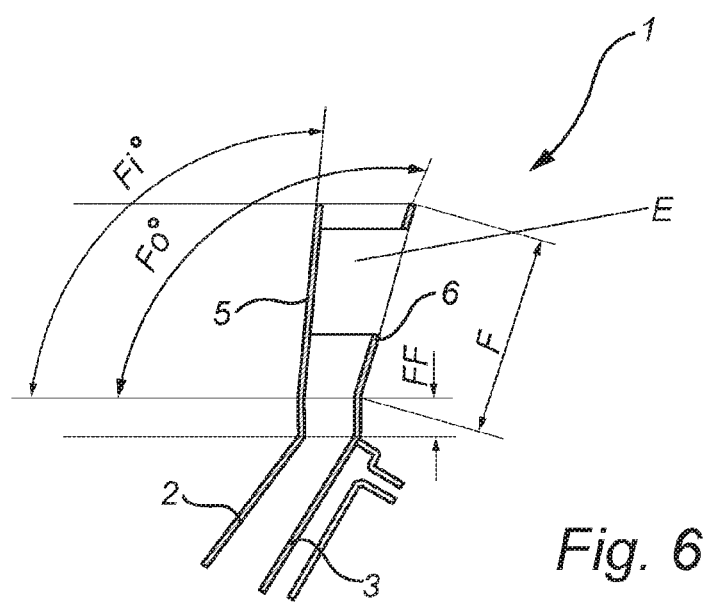
FIG. 6 shows the inner and outer extensions and as such the gap E according to one embodiment of the present invention.

As may be seen in FIG. 6, the gap E may be further defined according to the present invention. According to one embodiment of the present invention, the gap E may be defined by an angle Fi° which is the angle between a horizontal plane and the inner extension 5 and an angle Fo° which is the angle between the same horizontal plane and the outer extension 6, and wherein 21 degrees>(Fo°−Fi°)>−7 degrees and wherein 260 degrees>Fo°>65 degrees. Moreover, according to one specific embodiment, Fo° is in the range of from 90 to 120 degrees.

As may be seen in FIG. 6, the gap E may have one portion which has parallel inner extension 5 and outer extension 6 (see FF), and then a further portion of extension (see F) where these extensions 5, 6 are not parallel. Moreover, normally F is longer than FF as shown in FIG. 6.

Furthermore, according to yet another embodiment, the gap (E) (see FIG. 1) is in the range of 5≤E≤120 mm. According to one specific embodiment, the gap (E) is in the range of 10≤E≤60 mm, such as 15≤E≤45 mm. This gap and the extensions creating the gap are of importance for obtaining a massaging and rolling effect in the most upper part of the device, providing sausage-shaped final products.

According to yet another specific embodiment of the present invention, the inner extension and the outer extension have a length of up to 2000 mm (see (F) in FIG. 1). According to one specific embodiment, the inner extension and the outer extension have a length of up to 1000 mm. According to another specific embodiment, the inner extension and the outer extension have a length of up to 500 mm. According to yet another specific embodiment, the inner extension and the outer extension have a length in the range of from 60 to 350 mm. This length is of relevance for providing a rolling working effect.

Also other parameters may be of relevance. According to one specific embodiment, the outer cone has an outer diameter, at the outer extension, in the range of from 200 to 1800 mm. According to one specific embodiment, the outer cone has an outer diameter, at the outer extension, in the range of from 400 to 900 mm. Furthermore, according to yet another embodiment, a jacket is arranged outside of the outer cone. For example a double jacket may be arranged outside the outer cone. The jacket is normally arranged for providing cooling possibilities. Temperature control is important to knead a wheat dough in an effective way. Temperatures too high, or too low for that matter, effects both the dough as such, the kneading possibility of the dough, both mechanically and chemically (for promoting strong gluten bonds) and also the possibility of degassing of the dough.

DETAILED DESCRIPTION OF THE DRAWINGS

FIG. 1 shows a cross-sectional view of a kneading device 1 according to one specific embodiment of the present invention. The kneading device has an inner cone 2 and an outer cone 3 which defines an intermediate space 4. From a horizontal plane the inner cone 2 inclines and forms an angle ic, and the outer cone 3 inclines and forms an angle oc, and as seen, the outer cone 3 inclines more than the inner cone 2 so angle oc>angle ic. The inner cone 2 has an opening in the bottom thereof through which material falls which is intended to be kneaded. Both the inner cone 2 and the outer cone 3 continue vertically in an inner extension 5 and an outer extension 6 extending a distance F, and defining a gap E, in this case a vertically extending gap (E). As seen, on one position of the extensions 6, the outlet is provided. Furthermore, in this case a (cooling) jacket 13 is provided outside the outer cone 3.

FIG. 2 shows a kneading device 1 according to one embodiment of the invention. The centre portion 8 comprises three extending scraping wings 7 which extend towards the inner wall 9 of the outer cone 3. A uv angle is shown as an angle in a horizontal plane. The uv angle for each scraping wing 7 is the angle between a radius line, which is a line from the centre 10 of the kneading device 1 and which crosses a start 11 of a scraping wing 7 in a point 12 from which point 12 the scraping wing 7 extends towards the inner wall 9 of the outer cone 3, and the extension of each scraping wings 7.

Figure 3:
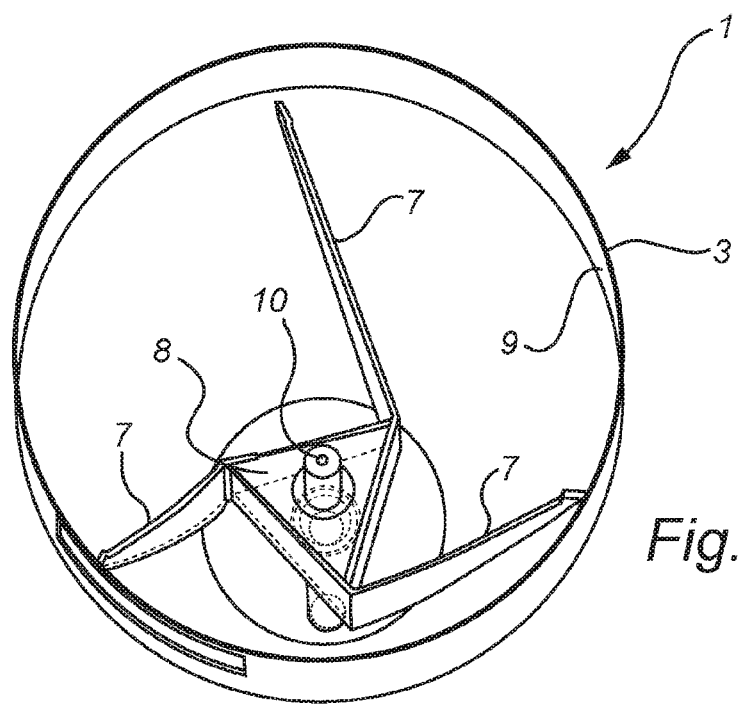
FIG. 3 shows a kneading device according to one embodiment of the present invention, viewed from above with an angle, and where the outer cone and the centre portion with the scraping wings are seen.

FIG. 3 shows a kneading device 1 according to one embodiment of the present invention, viewed from above with an angle, and where inter alia the outer cone 3 and the centre portion 8 with the scraping wings 7 are seen.

FIG. 4 also shows a kneading device 1 according to one embodiment, viewed from the side and as a sectional figure. In this case, also the bottom part axle of the kneading device 1 is shown. This axle is intended to be connected to some kind of driving motor device so that the rotation of the centre portion 8 and scraping wings 7 may be achieved.

Figure 5:
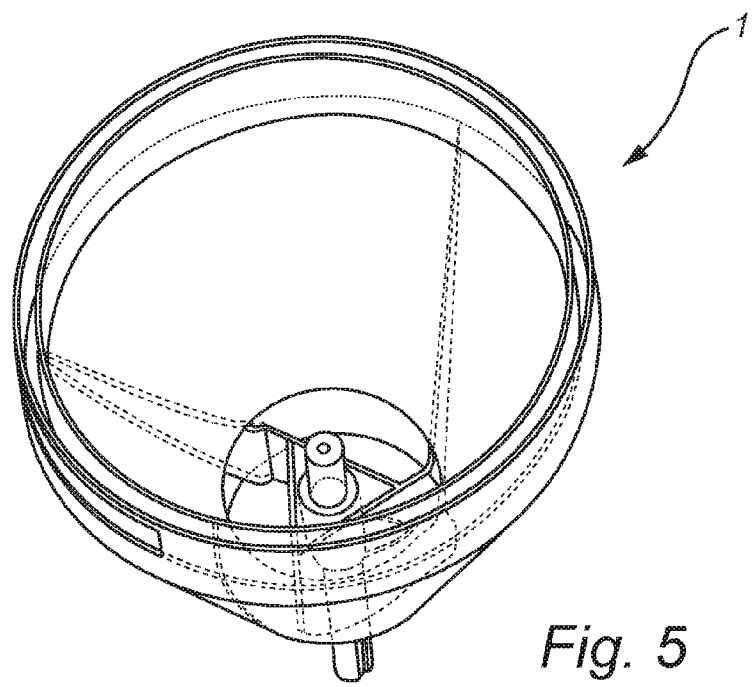
FIG. 5 shows a kneading device according to one embodiment of the present invention, viewed from above with an angle and as a sectional figure, and where the inner cone is also seen.

FIG. 5 shows a kneading device 1 according to one embodiment of the present invention, viewed from above with an angle and as a sectional figure, and where the inner cone 2 and also scraping wings 7 as dashed lines are also shown.

FIG. 6 shows the inner cone 2 and the outer cone 3 with their respectively inner extension 5 and outer extension 6 and as such the gap E according to one embodiment of the present invention. In this case the gap E has one portion which has parallel inner extension 5 and outer extension 6 (see FF), and then a further portion of extension (see F) where these extensions 5, 6 are not parallel. F is longer than FF, which is typical.

Figure 7:
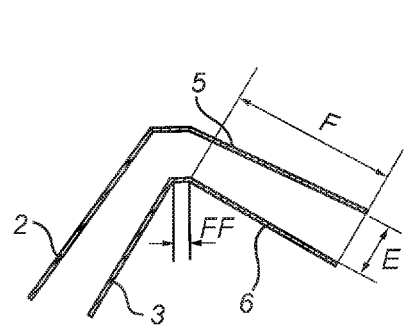
FIG. 7 shows the inner and outer extensions and the gap E according to another embodiment of the present invention.

FIG. 7 shows the inner cone 2 and outer cone 3 and their inner and outer extensions 5, 6 and the gap E according to another embodiment of the present invention. Also in this case the distances FF and F are shown.

Figure 8:
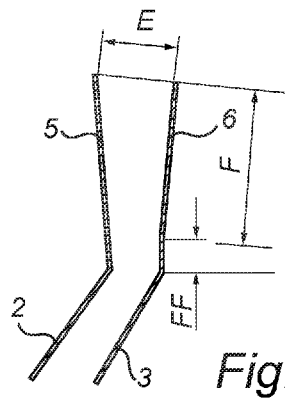
FIG. 8 shows the inner and outer extensions and the gap E according to another embodiment of the present invention, similar to the one shown in FIG. 6.

FIG. 8 shows another embodiment of the present invention, similar to the one shown in FIG. 6.

Figure 9:
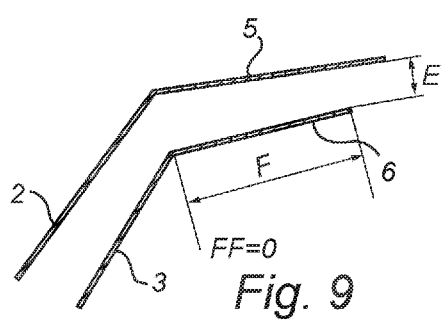
FIG. 9 shows the inner and outer extensions and the gap E according to yet another embodiment of the present invention.

FIG. 9 shows the inner cone 2 and outer cone 3 and their inner and outer extensions 5, 6 and the gap E according to yet another embodiment of the present invention. In this case FF is zero.

Figure 10:
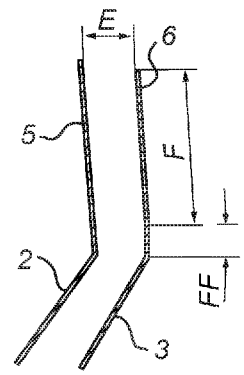
FIG. 10 shows the inner and outer extensions and the gap E according to another embodiment of the present invention.

Also FIG. 10 shows the inner cone 2 and outer cone 3 and their inner and outer extensions 5, 6 and the gap E according to another embodiment of the present invention. Also here FF and F are shown.

In relation to all FIGS. 7 to 10 it may be noted that the actual outlet is not depicted as the drawings are made as cross sectional views. There is of course an outlet provided somewhere along the circular gap E at a suitable position.

Figure 11:
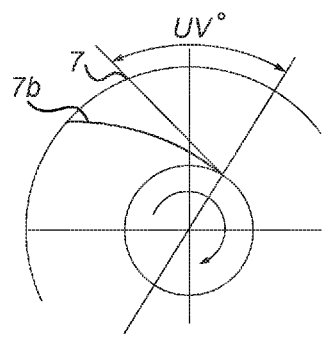
FIG. 11 shows two different versions of scraping wings designs according to the present invention.

FIG. 11 shows two different versions of scraping wings 7 and 7b according to the present invention. The possible scraping wing 7b shows a version which had a bent design instead of a straight as shown according to scraping wing 7.

Figure 12:
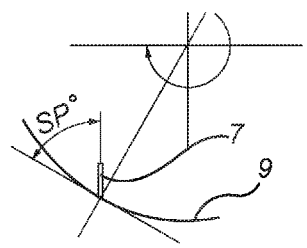
FIG. 12 shows a scraping wing according to one embodiment of the present invention, and as such visualizes the so called scraping angle (shown as SP°).

FIG. 12 shows a scraping wing 7 facing the surface being scraped and as such visualizes the so called scraping angle (shown as SP°).

Short Summarize

The present kneading device has several benefits. One first advantage is related to the purpose of the device, normally as gluten improver/enhancer. The kneading device is intended for post-work up of a wheat dough which dough is already mixed before to a dough possible to post-work or post-treat. The features of the kneading device according to the present invention, with a kneading zone and massaging zone, are optimal for such post working of a dough. As such, the kneading device is not intended as a mixer for production of the dough. Moreover, the kneading device according to the present invention promotes the formation of a post kneaded/massaged dough in which short and weak gluten bonds have been broken and where stronger gluten bonds are formed (in the kneading zone) and in which the production of long and elastic gluten bonds have been enhanced (in the massaging zone). Furthermore, the extensions and gap E ensures the rolling massage for this promotion of long elastic gluten for the already strong gluten bonds and hence ensures the production of sausage shaped dough products.

In view of the above described, the kneading device according to the present invention exhibits the possibility of achieving several benefits in one and the same device. In other devices such different working is normally obtained by regulating on the rpm, which thus is not the case of the device according to the present invention.

Some other advantages of the kneading device are facts like a) is run as a continuous device but works for both continuous and batch operations b) being able to provide temperature control which is very important when working a dough (at about 21-29° C. the dough is best to knead as it is not sticky, e.g. above 32° C. is problematic) and c) being able to produce degassed dough with a low level of contained gas inside. This latter advantage may be of great interest for mass control in final dough products. To promote degassing in a kneading device according to the present invention, the length of the scraping wings may be shortened.

Moreover, the scraping wings according to the present invention may be arranged differently so as to provide a different magnitude of the so called scraping angle (shown as SP°), i.e. the angle provided between the actual scraping wing and a totally orthogonal (square) line going out from the surface being scraped. As seen in FIG. 2, this scraping angle is normally not zero degrees. According to one specific embodiment of the present invention, the scraping angle is up to 35 degrees. According to yet another embodiment, the scraping angle is up to 15 degrees, such as about 10 degrees.

The invention claimed is:

1. Kneading device comprising an inner cone and an outer cone, wherein:
   the inner cone and the outer cone defines a space in between the inner cone and the outer cone;
   from a horizontal plane the inner cone inclines and forms an angle ic;
   from the same horizontal plane the outer cone inclines and forms an angle oc;
   the inner cone has an opening in a bottom of the inner cone;
   both the inner cone and the outer cone continue vertically in an inner extension and an outer extension, respectively, wherein a space in between the inner extension and the outer extension is a gap E;
   scraping wings extend from a centre portion of the kneading device and through the inner cone and the outer cone and towards, but not fixated to, an inner wall of the outer cone;
   wherein,
   the outer cone inclines more than the inner cone, when viewed from the horizontal plane, so that angle oc>angle ic
   and wherein,
   in a cross section, a radius line from the centre of the kneading device which crosses a start of one of said scraping wings in a point from which point said scraping wing extends towards the inner wall of the outer cone, and wherein the radius line and the extension of the scraping wing forms an angle uv, and wherein the angle uv has a relationship to the angle oc which is 1<(angle uv/angle oc)<2.

2. Kneading device according to claim 1, wherein the angle oc is in the range of 45-75 degrees.

3. Kneading device according to claim 1, wherein the angle oc is at least 15 degrees larger than the angle ic.

4. Kneading device according to claim 1, wherein (angle uv/angle oc) is <1.2.

5. Kneading device according to claim 1, wherein the kneading device comprises from 2 to 4 scraping wings.

6. Kneading device according to claim 1, wherein the gap E is extending upwards.

7. Kneading device according to claim 1, wherein the gap E is extending downwards.

8. Kneading device according to claim 1, wherein the gap E is extending outwards.

9. Kneading device according to claim 1, wherein the gap E is extending upwards and vertically.

10. Kneading device according to claim 1, wherein the gap E is defined by an angle Fi° which is the angle between a horizontal plane and the inner extension and an angle Fo° which is the angle between the same horizontal plane and the outer extension, and wherein 21 degrees>(Fo°−Fi°)>−7 degrees and wherein 260 degrees>Fo°>65 degrees.

11. Kneading device according to claim 1, wherein the gap E is in the range of 5≤E≤120 mm.

12. Kneading device according to claim 1, wherein the inner extension and the outer extension have a length of below 1000 mm.

13. Kneading device according to claim 1, wherein the outer cone has an outer diameter, at the outer extension, in the range of from 200 to 1800 mm.

14. Kneading device according to claim 1, wherein a jacket is arranged outside of the outer cone.

* * * * *